US007200717B2

(12) United States Patent
Guthrie et al.

(10) Patent No.: US 7,200,717 B2
(45) Date of Patent: Apr. 3, 2007

(54) PROCESSOR, DATA PROCESSING SYSTEM AND METHOD FOR SYNCHRONIZING ACCESS TO DATA IN SHARED MEMORY

(75) Inventors: Guy Lynn Guthrie, Austin, TX (US); Sheldon B. Levenstein, Austin, TX (US); William John Starke, Round Rock, TX (US); Derek Edward Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 341 days.

(21) Appl. No.: 10/965,144

(22) Filed: Oct. 14, 2004

(65) Prior Publication Data

US 2006/0085604 A1 Apr. 20, 2006

(51) Int. Cl.
*G06F 12/00* (2006.01)
(52) U.S. Cl. .................. 711/125; 711/141; 711/142; 711/145; 711/156; 712/216; 712/234
(58) Field of Classification Search ................ 711/125, 711/141, 142, 145, 156; 712/216, 234
See application file for complete search history.

(56) References Cited

U.S. PATENT DOCUMENTS

| | | | | |
|---|---|---|---|---|
| 5,862,371 A | * | 1/1999 | Levine et al. ............... 712/228 |
| 5,895,495 A | * | 4/1999 | Arimilli et al. ............. 711/156 |
| 6,145,059 A | * | 11/2000 | Arimilli et al. ............. 711/143 |
| 6,330,643 B1 | * | 12/2001 | Arimilli et al. ............. 711/141 |
| 6,345,340 B1 | * | 2/2002 | Arimilli et al. ............. 711/141 |
| 6,347,361 B1 | * | 2/2002 | Arimilli et al. ............. 711/141 |
| 6,418,514 B1 | * | 7/2002 | Arimilli et al. ............. 711/133 |
| 6,549,989 B1 | * | 4/2003 | Arimilli et al. ............. 711/144 |
| 6,629,209 B1 | * | 9/2003 | Arimilli et al. ............. 711/141 |
| 6,629,212 B1 | * | 9/2003 | Arimilli et al. ............. 711/144 |

OTHER PUBLICATIONS

Adir et al., "Information-Flow Models for Shared Memory with an Application to the PowerPC Architecture," pp. 502-515, IEEE, May 2003.*

* cited by examiner

*Primary Examiner*—Stephen C. Elmore
(74) *Attorney, Agent, or Firm*—Diana R. Gerhardt; Dillon & Yudell LLP

(57) ABSTRACT

A processing unit for a multiprocessor data processing system includes a processor core including a store-through upper level cache, an instruction sequencing unit that fetches instructions for execution, a data register, and at least one instruction execution unit coupled to the instruction sequencing unit that concurrently executes multiple threads of instructions. The processor core, responsive to the at least one instruction execution unit executing a load-reserve instruction in a first thread that binds to a load target address in the store-through upper level cache during a reservation hazard window associated with a conflicting store-conditional operation of a second thread, causes a subsequent store-conditional operation of the first thread to a store target address matching the load target address to fail if the store-conditional operation of the second thread succeeds.

20 Claims, 13 Drawing Sheets

PROCESSOR, DATA PROCESSING SYSTEM AND METHOD FOR SYNCHRONIZING ACCESS TO DATA IN SHARED MEMORY

CROSS-REFERENCE TO RELATED APPLICATIONS

The present application is related to the following applications, which are filed on even date herewith, assigned to the same assignee, and incorporated herein by reference in their entireties:
(1) U.S. patent application Ser. No. 10/965,113;
(2) U.S. patent application Ser. No. 10/965,151.

BACKGROUND OF THE INVENTION

1. Technical Field

The present invention relates in general to data processing system and, in particular, to managing accesses to shared data in a data processing system. Still more particularly, the present invention relates to a processor, data processing system and method for synchronizing accesses to data in shared memory.

2. Description of the Related Art

In shared memory multiprocessor (MP) data processing systems, each of the multiple processors in the system may access and modify data stored in the shared memory. In order to synchronize access to a particular granule (e.g., cache line) of memory between multiple processing units and threads of execution, load-reserve and store-conditional instruction pairs are often employed. For example, load-reserve and store-conditional instructions have been implemented in the PowerPC® instruction set architecture with operation codes (opcodes) associated with the LWARX and STWCX mnemonics, respectively (referred to hereafter as LARX and STCX). The goal of load-reserve and store-conditional instruction pairs is to load and modify data and then to commit the modified data to coherent memory only if no other thread of execution has modified the data in the interval between the load-reserve and store-conditional instructions. Thus, updates to shared memory can be synchronized without the use of an atomic update primitive that strictly enforces atomicity.

With reference now to FIG. 1, a block diagram of a conventional MP computer system supporting the use of load-reserve and store-conditional instructions to synchronize updates to shared memory is illustrated. As shown, computer system 100 includes multiple processing units 102a–102b for processing data and instructions. Processing units 102 are coupled for communication to a system bus 104 for conveying address, data and control information between attached devices. In the depicted embodiment, the attached devices include a memory controller 106 providing an interface to a system memory 108 and one or more host bridges 110, each providing an interface to a respective mezzanine bus 112. Mezzanine bus 112 in turn provides slots for the attachment of additional devices, which may include network interface cards, I/O adapters, non-volatile storage device adapters, additional bus bridges, etc.

As further illustrated in FIG. 1, each processing unit 102 includes a processor core 120 containing an instruction sequencing unit 122 for fetching and ordering instructions for execution by one or more execution units 124. The instructions and associated data operands and data results are stored in a multi-level memory hierarchy having at its lowest level system memory 108, and at its upper levels L1 cache 126 and L2 cache 130. The data within the memory hierarchy may generally be accessed and modified by multiple processing units 102a, 102b.

L1 cache 126 is a store-through cache, meaning that the point of cache coherency with respect to other processing units 102 is below the L1 cache (e.g., at L2 cache 130). L1 cache 126 therefore does not maintain true cache coherency states (e.g., Modified, Exclusive, Shared, Invalid) for its cache lines, but only maintains valid/invalid bits. Store operations first complete relative to the associated processor core 120 in the L1 cache and then complete relative to other processing units 102 in L2 cache 130.

As depicted, in addition to the L2 cache array 140, L2 cache 130 includes read-claim (RC) logic 142 for managing memory access requests by the associated processor core 120, snoop logic 144 for managing memory access requests by other processing units 102, and reservation logic 146 for recording reservations of the associated processor core 120. Reservation logic 146 includes at least one reservation register comprising a reservation address field 148 and a reservation flag 150.

FIG. 2A depicts the manner in which a load-reserve (e.g., LARX) instruction is processed in data processing system 100 of FIG. 1. As shown, the process begins at block 200, which represents the execution of a LARX instruction by execution units 124 of processing unit 102a in order to determine the target address from which data is to be loaded. Following execution of the LARX instruction, L1 cache 126 invalidates the cache line containing the target address at block 202. The cache line is invalidated in L1 cache 126 to prevent the LARX instruction from binding to a potentially stale value in L1 cache 126. The value is potentially stale because another processing unit 102 may have gained ownership of the target cache line in order to modify it.

Following block 202, the process passes to block 204, which illustrates processor core 120 issuing a LARX operation corresponding to the LARX instruction to RC logic 142 within L2 cache 130. As depicted at bock 206, RC logic 142 stores the address of the reservation granule (e.g., cache line) containing the target address in reservation address field 148 and sets reservation flag 150. Reservation logic 146 then begins monitoring for an indication by snoop logic 144 that another processing unit 102 has updated the cache line containing the target address. As illustrated at block 208, RC logic 142 obtains the load data from L2 cache array 140, system memory 108 or another processing unit 102 and then returns the requested load data to processor core 120. In response to receipt of the load data, processor core 120 stores the load data in an internal register, but not in L1 cache 126.

Processor core 120 thereafter attempts to perform an atomic update to the load data through the execution of a store-conditional (e.g., STCX) instruction in accordance with the process depicted in FIG. 2B. As shown, the process begins at block 220, which represents execution units 124 executing the store-conditional instruction to determine the target address of the store-conditional operation. Next, as depicted at block 222, the cache line containing the target address is invalidated in L1 cache 126, if valid. Although the cache line was invalidated earlier at block 202, the invalidation is still performed at block 222 because an intervening load operation to another address in the cache line may have caused the cache line to be loaded back into L1 cache 126.

Following block 222, processor core 120 issues a store-conditional (e.g., STCX) operation corresponding to the store-conditional instruction to RC logic 142 within L2 cache 130, as shown at block 224. RC logic 142 obtains owner permission for the target cache line and then determines at block 226 whether or not reservation flag 150 is still set (i.e., whether or not any other processing unit 102 has modified the reservation granule). If reservation flag 150 is still set, indicating that no other processing unit 102 has modified the reservation granule, RC logic 142 updates L2 cache array 140 with the store data and resets reservation flag 150, as shown at block 228. Reservation logic 146 then sends a pass indication to processor core 120, as shown at block 230. Thereafter, the process ends at block 234.

Returning to block 226, in response to a determination that reservation flag 150 is reset, indicating that another processing unit 102 has modified the reservation granule in the interval between execution of the load-reserve and store-conditional instructions, the store-conditional operation fails in L2 cache 130, and reservation logic 146 transmits a fail indication to processor core 120, as depicted at block 232. Thereafter, processing of the store-conditional operation terminates at block 234.

FIG. 2C illustrates the conventional operation of snoop logic 144 in support of shared memory updates utilizing load-reserve and store-conditional instructions. As depicted, the process begins at block 240 and thereafter proceeds to block 242, which illustrates the process iterating until snoop logic 144 snoops an operation on system bus 104. When snoop logic 144 snoops an operation on system bus 104, snoop logic 144 allocates a snooper to handle the operation at block 244. The snooper determines at block 246 whether or not the snooped operation is a storage-modifying operation. If not, the process passes to block 252 for other processing and thereafter terminates at block 254. If, however, the snooper determines that the snooped operation is a storage-modifying operation, the snooper makes a further determination at block 248 whether the address of the modifying operation matches the contents of reservation address field 148. If so, the snooper resets reservation flag 150 to cause any subsequent store-conditional operation to the address specified in reservation address field 148 to fail, as shown at block 250. Following block 250 or following a determination at block 248 that the address of the snooped modifying operation matches the contents of reservation address field 148, the snooper performs other processing at block 252 (e.g., updating the directory of L2 cache array 140). The process thereafter terminates at block 254.

SUMMARY OF THE INVENTION

The present invention appreciates that the above-described conventional technique of updating shared memory utilizing load-reserve and store-conditional instructions has a number of drawbacks. For example, the conventional methodology described with respect to FIGS. 2A–2B is subject to significant communication latency in that it always requires two separate "round trip" communications between processor core 120 and L2 cache 130. The first "round trip" includes the issuance of a load-reserve operation to L2 cache 130 at block 204 and the return of the load data at block 208, and the second "round trip" includes the issuance of a store-conditional operation to L2 cache 130 at block 224 and the return of a pass/fail indication at block 230.

In addition, the conventional technique of updating shared memory utilizing load-reserve and store-conditional instructions disadvantageously results in the invalidation of the target cache line in L1 cache 126. As will be appreciated, one advantage of caching data is that software often exhibits locality of reference, meaning that data within the same cache line as the data updated by the load-reserve/store-conditional pair is frequently referenced by other nearby instructions. Unfortunately, the invalidation of the cache line in L1 cache 126 delays the execution of such instructions until the cache line is loaded back into L1 cache 126 from L2 cache 130.

In view of these and additional shortcomings in the prior art, the present invention provides improved processors, data processing systems and methods for synchronizing updates to a shared memory utilizing load-reserve and store-conditional instructions. According to at least one embodiment, a processing unit for a multiprocessor data processing system includes a processor core including a store-through upper level cache, an instruction sequencing unit that fetches instructions for execution, a data register, and at least one instruction execution unit. The instruction execution unit, responsive to receipt of a load-reserve instruction from the instruction sequencing unit, executes the load-reserve instruction to determine a load target address. The processor core, responsive to the execution of the load-reserve instruction, performs a corresponding load-reserve operation by accessing the store-through upper level cache utilizing the load target address to cause data associated with the load target address to be loaded from the store-through upper level cache into the data register and by establishing a reservation for a reservation granule including the load target address.

In another embodiment, a processing unit for a multiprocessor data processing system includes a processor core including a store-through upper level cache, an instruction sequencing unit that fetches instructions for execution, a data register, and at least one instruction execution unit coupled to the instruction sequencing unit that concurrently executes multiple threads of instructions. The processor core, responsive to the at least one instruction execution unit executing a load-reserve instruction in a first thread that binds to a load target address in the store-through upper level cache during a reservation hazard window associated with a conflicting store-conditional operation of a second thread, causes a subsequent store-conditional operation of the first thread to a store target address matching the load target address to fail if the store-conditional operation of the second thread succeeds.

All objects, features, and advantages of the present invention will become apparent in the following detailed written description.

BRIEF DESCRIPTION OF THE DRAWINGS

The novel features believed characteristic of the invention are set forth in the appended claims. However, the invention, as well as a preferred mode of use, will best be understood by reference to the following detailed description of an illustrative embodiment when read in conjunction with the accompanying drawings, wherein:

DETAILED DESCRIPTION OF ILLUSTRATIVE EMBODIMENT

Figure 3:
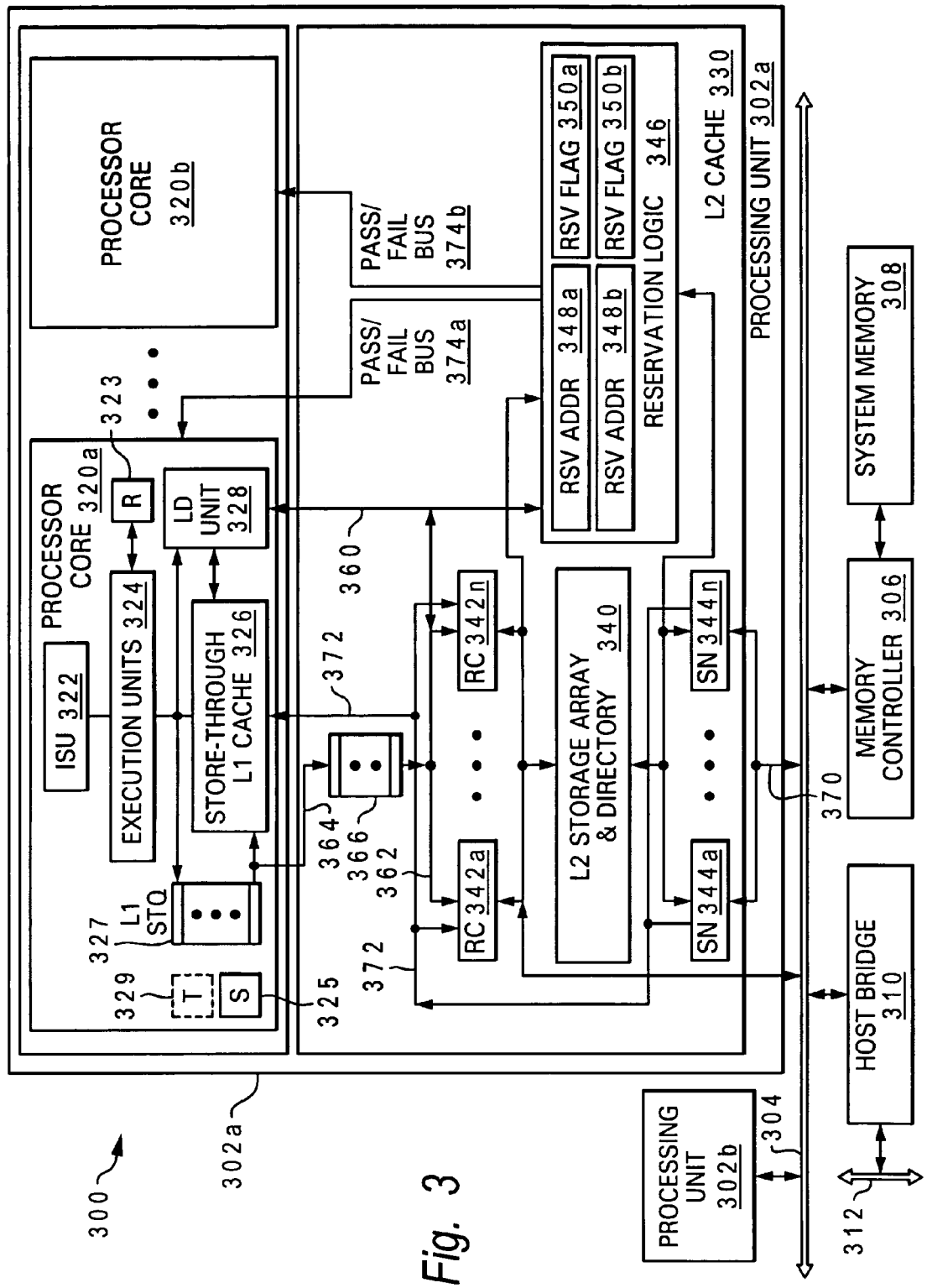
FIG. 3 is a high level block diagram of an illustrative data processing system in accordance with the present invention.

With reference again to the figures and in particular with reference to FIG. 3, there is illustrated a high level block diagram of an exemplary embodiment of a multiprocessor data processing system in accordance with the present invention. As shown, data processing system 300, which may be, for example, a server or workstation computer, includes multiple processing units 302a, 302b for processing data and instructions. Processing units 302 are coupled for communication to a system interconnect 304 for conveying address, data and control information between attached devices. The attached devices include not only processing units 302, but also a memory controller 306 providing an interface to a shared system memory 308 and one or more host bridges 310, each providing an interface to a respective mezzanine bus 312. Mezzanine bus 312 in turn provides slots for the attachment of additional unillustrated devices, which may include network interface cards, I/O adapters, non-volatile memory, non-volatile storage device adapters, additional bus bridges, etc.

As further illustrated in FIG. 3, each processing unit 302, which may be realized as a single integrated circuit, includes one or more processor cores 320a, 320b for processing instructions and data. Each processor core 320 includes execution units 324 for executing instructions and an instruction sequencing unit (ISU) 322 for fetching and ordering instructions for execution by the execution units 324. In accordance with the present invention, the instructions executed by execution units 324 include load-reserve and store-conditional instructions, which are utilized to synchronize access to shared memory between a particular thread of execution and other concurrent threads of execution, whether executing in the same processor core 320, a different processor core 320 in the same processing unit 302, or in a different processing unit 302. In a preferred embodiment, execution units 324 execute at least load-reserve and store-conditional instructions in-order (other instructions may or may not be executed out-of-order).

Each processor core 320 further includes an L1 store queue (STQ) 327 and a load unit 328 for managing the completion of store and load operations, respectively, corresponding to executed store and load instructions (including load-reserve and store-conditional instructions). In a preferred embodiment, L1 STQ 327 is implemented as a First-In, First-Out (FIFO) queue containing a plurality of queue entries. Store operations are accordingly loaded in the "top" entry of L1 STQ 327 at execution of the corresponding store instruction to determine the target address, and are initiated when the store operation reaches the "bottom" or "commit" entry of L1 STQ 327.

It is important to note that the present application makes a distinction between "instructions", such as load-reserve and store-conditional instructions, and "operations". Load and store "instructions" (including load-reserve and store-conditional instructions) are defined herein as inputs to an execution unit that include an operation code (opcode) identifying the type of instruction and one or more operands specifying data to be accessed and/or its address. Load and store "operations", including load-reserve and store-conditional operations, are defined herein as data and/or signals generated following instruction execution that specify the address of data to be accessed. Thus, load-reserve and store-conditional operations may be transmitted from a processor core 320 to lower level memory to initiate data accesses, while load-reserve and store-conditional instructions are not.

The operation of processor core 320 is supported by a multi-level volatile memory hierarchy having at its lowest level shared system memory 308, and at its upper levels two or more levels of cache memory, which in the illustrative embodiment include L1 cache 326 and L2 cache 330. In the particular embodiment shown in FIG. 3, L2 cache 330 is shared by all processor cores 320 within a processing unit 302. As in other shared memory MP data processing systems, the contents of the memory hierarchy may generally be accessed and modified by threads of execution executing in any processor core 320 in any processing unit 302 of data processing system 300.

In accordance with the present invention, L1 cache 326, which may include bifurcated L1 data and instruction caches, is implemented as a store-through cache, meaning that the point of cache coherency with respect to other processor cores 320 is located below L1 cache 326 and, in the depicted embodiment, is located at L2 cache 330. Accordingly, as described above, L1 cache 326 does not maintain true cache coherency states (e.g., Modified, Exclusive, Shared, Invalid) for its cache lines, but only maintains valid/invalid bits. Because L1 cache 326 is implemented as a store-through cache, store operations (including store-conditional operations) first complete relative to the associated processor core 120 in L1 cache 326 and then complete relative to other processing units 302 at a point of system-wide coherency, which in the depicted embodiment is L2 cache 330.

Figure 1:
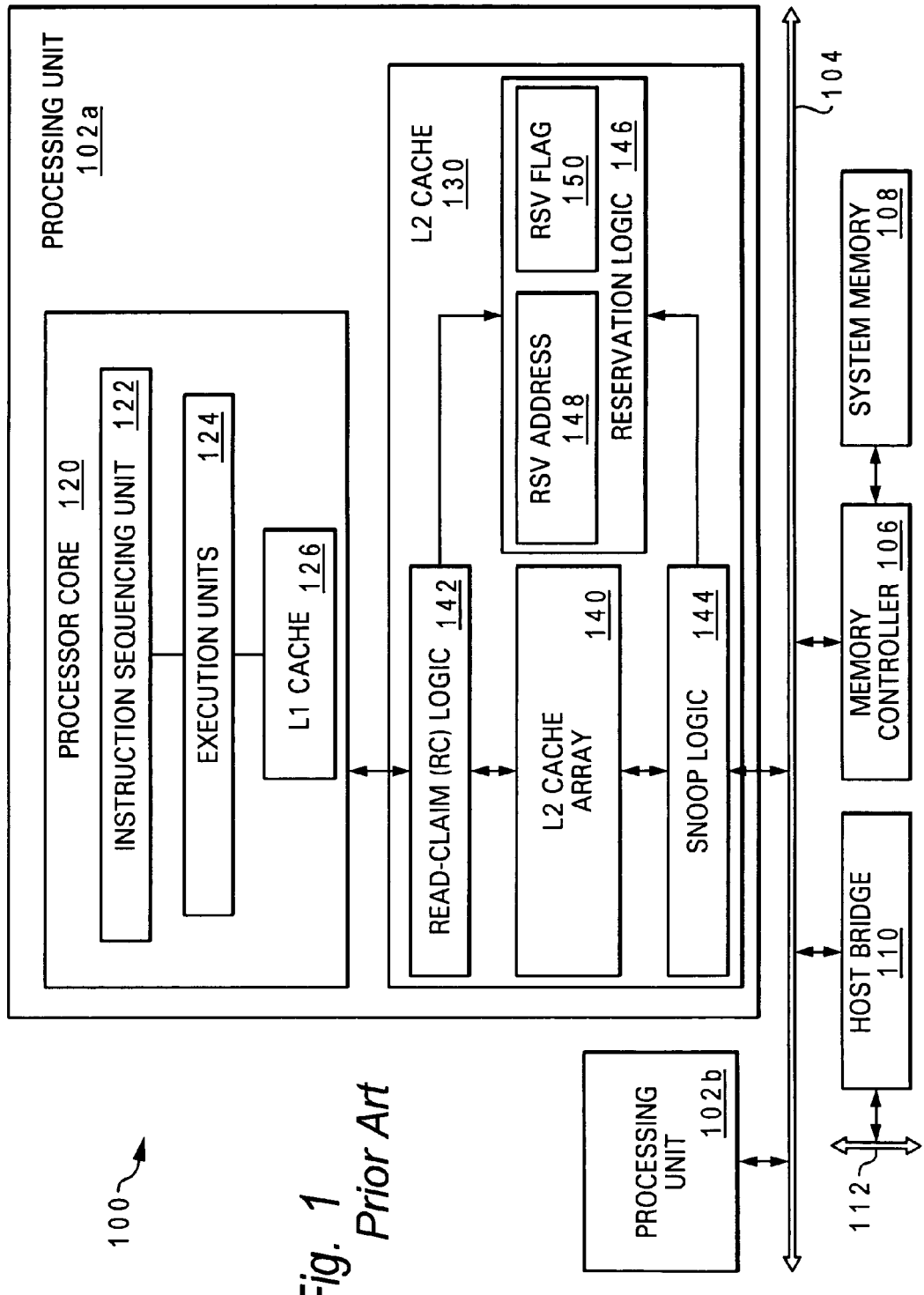
FIG. 1 is a high level block diagram of a conventional data processing system that utilizes load-reserve and store conditional instructions to update shared memory.
Figures 2A, 2B:
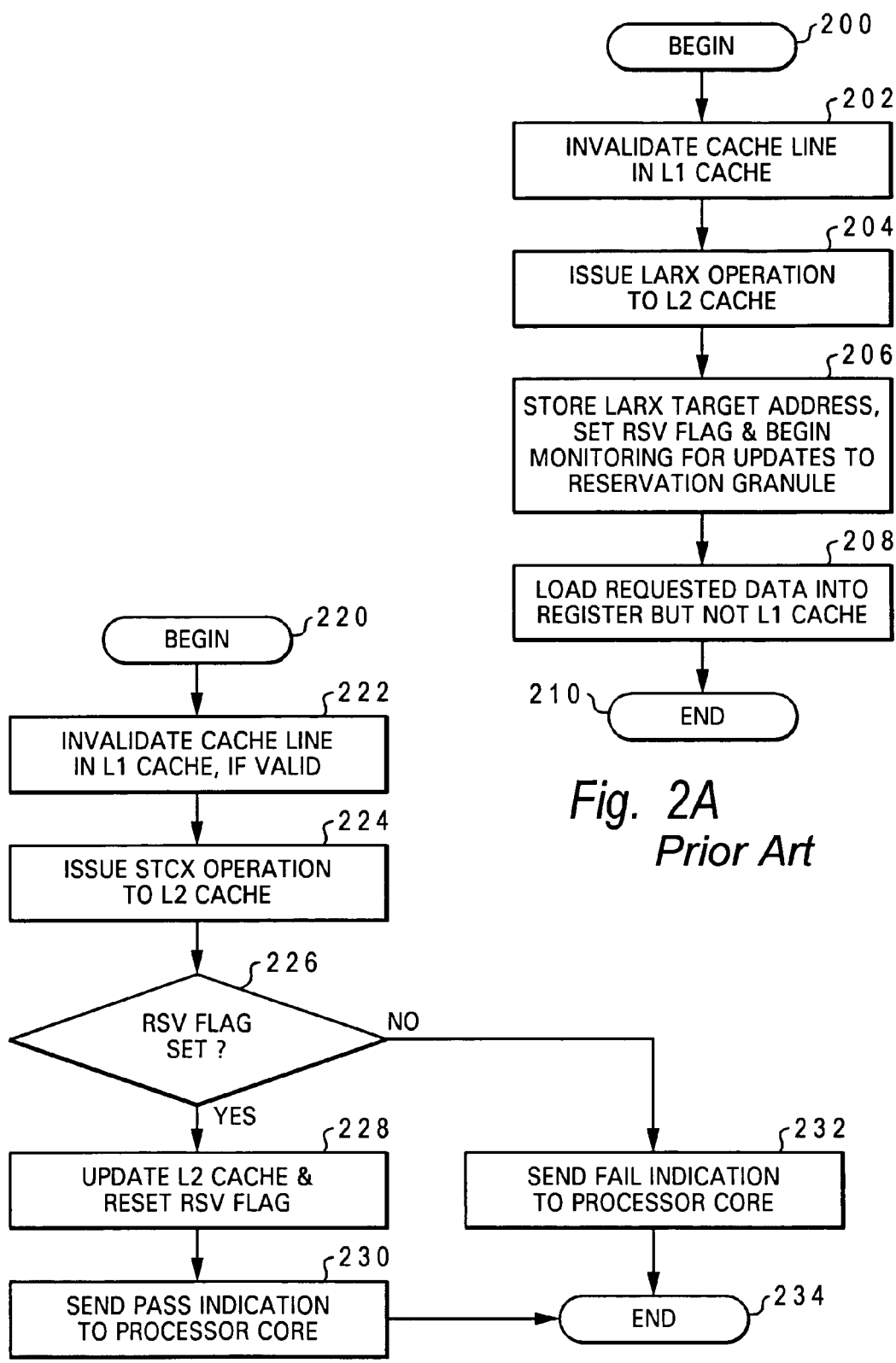
FIG. 2A is a flowchart of a conventional method of processing a load-reserve instruction.
FIG. 2B is a flowchart of a conventional method of processing a store-conditional instruction.
Figure 2C:
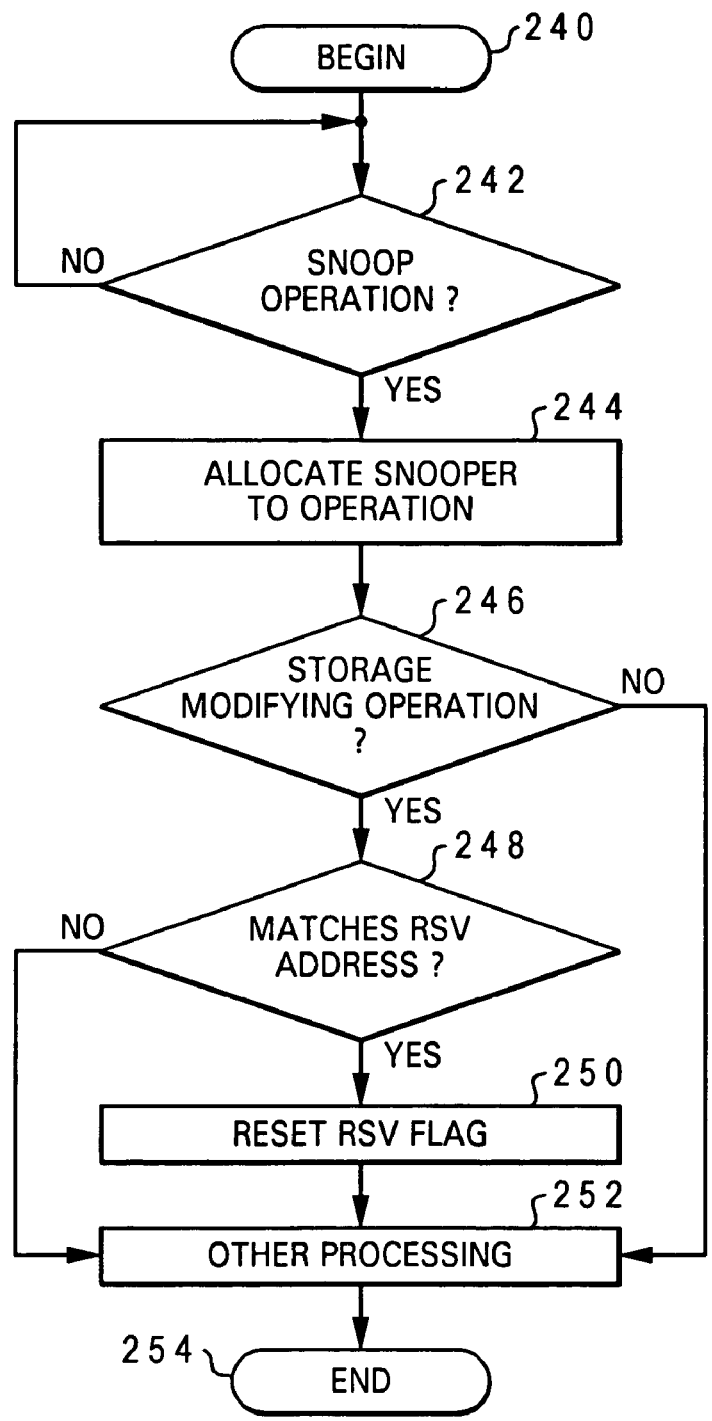
FIG. 2C is a flowchart of a conventional method of processing operations snooped on a system bus.

As further illustrated in FIG. 1, L2 cache 330 contains a storage array and directory 340 that store cache lines of instructions and data in association with their respective memory addresses. L2 cache 330 also includes a number of instances of read-claim (RC) logic 342a–342n for managing memory access operations received from the associated processor cores 320. RC logic instances 342a–342n receive load operations from LD unit 328 in processor core 320 via load bus 360 and command bus 362, and receive store operations from L1 STQ 327 in processor core 320 via store bus 364, an in-order L2 STQ 366, and command bus 362.

L2 cache 330 further includes a number of instances of snoop (SN) logic 344a–344n for managing memory access and other operations received from other processing units 302 via system interconnect 304 and snoop bus 370. Snoop logic instances 344 and RC logic instances 342 are each connected to a back-invalidation bus 372 by which any snoop logic instance 344 or RC logic instance 342 can signal the invalidation of a cache line to processor core 320.

L2 cache 330 finally includes reservation logic 346 for recording reservations of the associated processor core(s) 320. Specifically, reservation logic 346 includes, for each thread that may be concurrently executed by the processor core(s) 320 in its processing unit 302, a respective reservation register comprising a reservation address field 348 and a reservation flag 350. For example, in the depicted example, which assumes that processor cores 320a and 320b can each execute a single thread, reservation logic 346 includes two reservation registers: reservation address field 348a and reservation flag 350a for processor core 320a and reservation address field 348b and reservation flag 350b for processor core 320b. When set (e.g., to '1'), a reservation flag 350 indicates that the associated processor core 320 holds a reservation for the address contained in reservation address field 348 and otherwise indicates no reservation is held. Reservation logic 346 supplies pass/fail indications indicating the outcomes of store-conditional operations to processor cores 320a, 320b via respective pass/fail buses 374a, 374b.

Figure 4A:
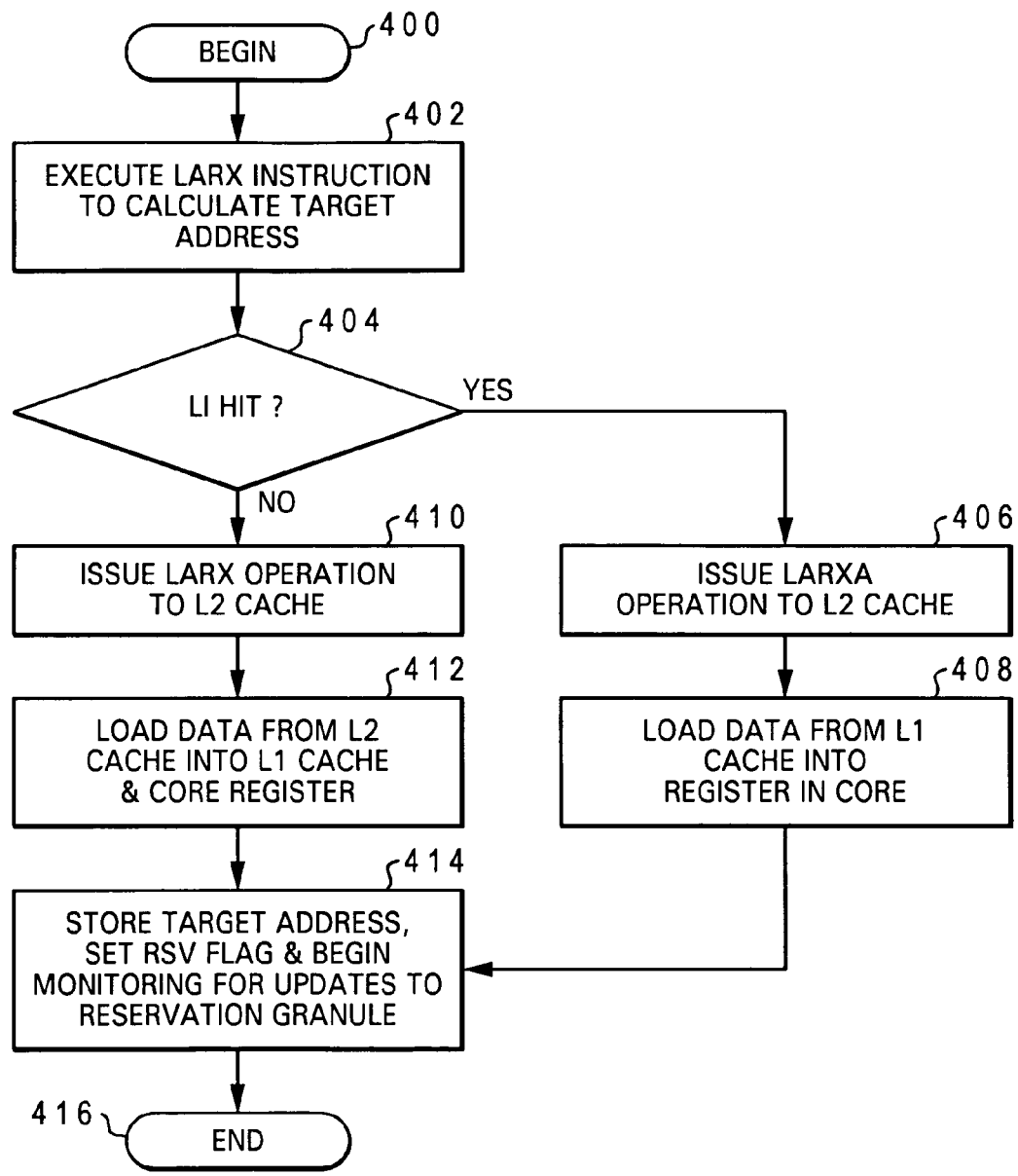
FIG. 4A is a high level logical flowchart of an exemplary method of processing a load-reserve instruction in accordance with the present invention.

Referring now to FIG. 4A, there is depicted a high level logical flowchart of an exemplary method by which data processing system 300 processes a load-reserve instruction in accordance with the present invention. As shown, the process begins at block 400 and thereafter proceeds to block 402, which illustrates execution units 324 receiving a load-reserve instruction, referred to hereinafter as a LARX instruction, from ISU 322 and then executing the LARX instruction to calculate the load target address. In a preferred embodiment, execution units 324 execute LARX instructions within a hardware thread in-order and without pipelining, meaning that the data words(s) requested by a LARX instruction must be loaded to one or more registers 323 in processor core 320 before the next LARX instruction begins execution. These restrictions simplify the management of reservations by reservation logic 346 in L2 cache 330.

Following execution of the LARX instruction, the load target address is received from execution units 324 by LD unit 328. As illustrated at block 404, LD unit 328 then accesses the directory of L1 cache 326 to determine whether a cache line containing the data word(s) associated with the load target address resides in L1 cache 326. If not, L1 cache 326 signals a cache miss to LD unit 328, which responds by issuing a LARX operation to an RC logic instance 342 via load bus 360 and command bus 362, as shown at block 410. Next, at block 412, the RC logic instance 342 initiates an access to L2 storage array and directory 340 to retrieve the cache line of data identified by the load target address and returns the requested cache line to processor core 320. Processor core 320 loads the entire cache line of data within L1 cache 326 and transfers the data word(s) associated with the load target address in a core register 323. Thus, unlike prior art processors that only load the data word(s) associated with the load target address in core register(s) and do not cache the target cache line, processor core 320 of data processing system 300 establishes the target cache line in L1 cache 326 to permit subsequent loads, and particularly subsequent load-reserve operations, to hit in L1 cache 326. Next, as illustrated at block 414, the RC logic instance 342 establishes a reservation for the load target address in L2 cache 330 by placing the load target address in a reservation address field 348 and setting the associated reservation flag 350. Thereafter, reservation logic 346 begins monitoring for an indication that the reservation granule has been updated, and the process terminates at block 416.

Returning to block 404, in response to LD unit 328 determining that the load target address hit in L1 cache 326, LD unit 328 issues an address-only LARXA operation to an RC logic instance 342 via load bus 360 and command bus 362 to inform L2 cache 330 that the load-reserve has bound to a (potentially stale) value in L1 cache 326. If processing unit 302 implements multiple processor cores 320 and/or processor core(s) 320 capable of executing multiple concurrent threads of execution, the LARXA operation preferably includes not only the load target address, but also the core ID and thread ID that executed the LARX instruction.

As shown at block 408, L1 cache 326 loads the data word(s) associated with the load target address into one or more core registers 323 associated with execution units 324. Thereafter, the process passes to block 414, which has been described.

In order to ensure that the reservation established at block 414 is properly subject to any snoop operations that may cancel the reservation, the interval between processing of the LARXA operation by LD unit 328 at block 404 to the presentation of the LARXA operation on load bus 360 as depicted at block 406 must be a short, bounded time that is appreciably less than the time between generation of a STCX operation and its issuance by L1 STQ 327. It is not required, however, that this interval be fixed to a particular number of cycles. To ensure the time to presentation of a LARXA operation is bounded, execution units 324 ensure that no other load (including load-reserve) instructions are executed in any thread in the same processor core 320 within one L2 (not core) cycle of the execution of the load-reserve instruction. This condition guarantees that load bus 360 will be available for LD unit 328 to transmit the LARXA operation to L2 cache 330 in a non-blocking fashion. In addition, LD unit 328 ignores any busy signals on load bus 360 for purposes of presenting LARXA operations because LARXA operations are processed only by reservation logic 346 (and not RC logic instances 342) and therefore do not need to be delayed, even if RC logic instances 342 are all busy.

Figure 4B:
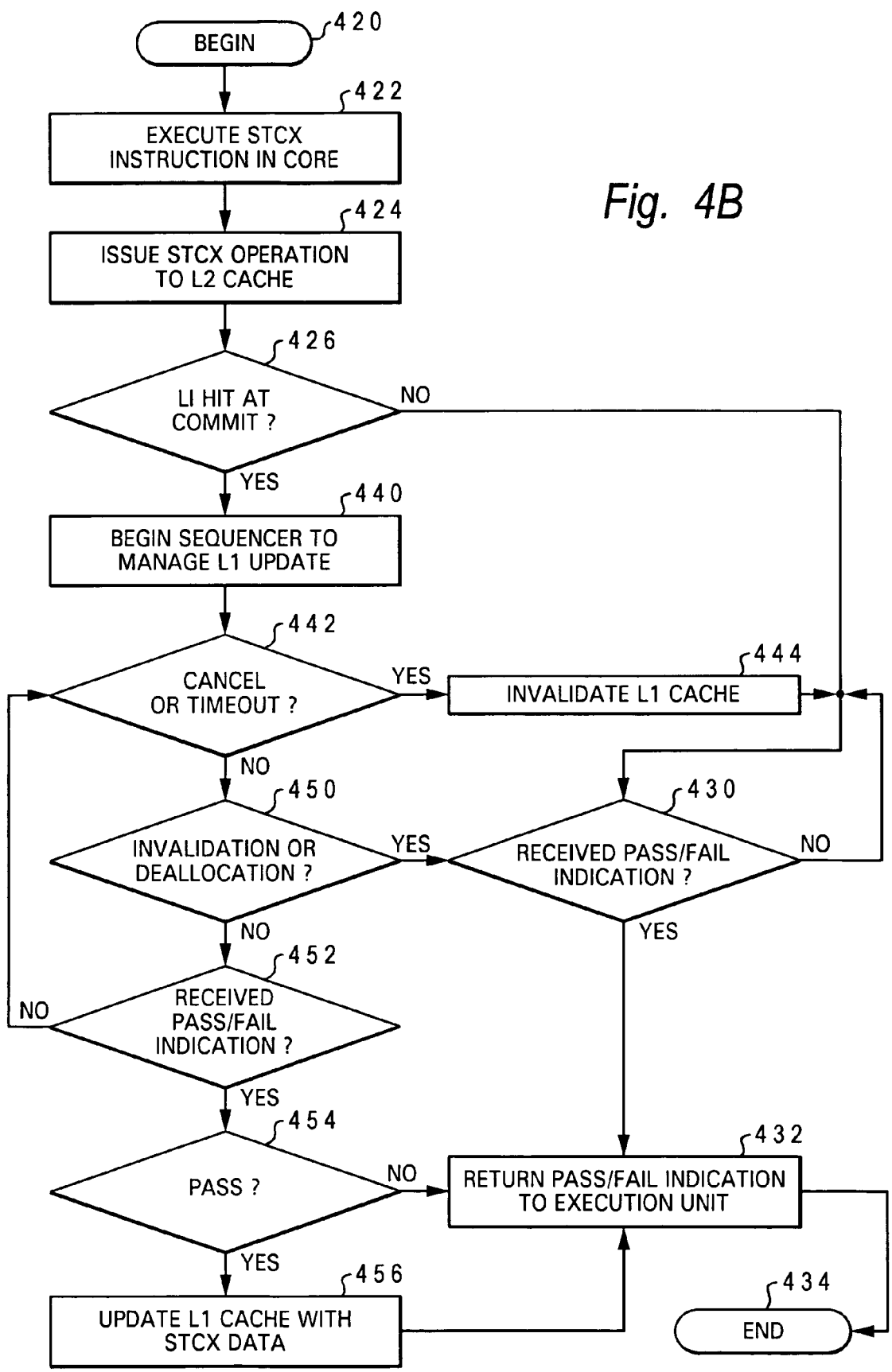
FIG. 4B is a high level logical flowchart of an exemplary method of processing a store-conditional instruction and corresponding store-conditional operation in a processor core in accordance with the present invention.

With reference now to FIG. 4B, there is illustrated a high level logical flowchart of an exemplary method of processing a store-conditional instruction in a processor core in accordance with the present invention. As depicted, the process begins at block 420 and thereafter proceeds to block 422, which illustrates execution units 324 receiving a store-conditional instruction, referred to hereinafter as a STCX instruction, from ISU 322 and then executing the STCX instruction to calculate the store target address. As with LARX execution described above, execution units 324 also preferably execute STCX instructions within the same hardware thread in-order and without pipelining. Upon execution of the STCX instruction, execution units 324 place a corresponding STCX operation including the store target address within L1 STQ 327, which is preferably implemented as a FIFO queue for buffering store operations that is shared by all threads executing within a processor unit 302.

Following block 422, the process proceeds to block 424, which depicts L1 STQ 327 issuing a STCX operation to L2 STQ 366 via store bus 364 when the STCX operation reaches the bottom (or "commit") entry of L1 STQ 327. In addition, as depicted at block 426, L1 STQ 327 determines, when the STCX operation reaches the commit entry of L1 STQ 327, whether the STCX operation hit in L1 cache 326. If the store target address misses in L1 cache 326 at the commit entry of L1 STQ 327, the process passes to block 430, which depicts L1 STQ 327 awaiting a pass/fail indication indicating whether or not the STCX operation succeeded at L2 cache 330 (i.e., with respect to all other threads and cache coherent processing units 302). In response to receipt of the pass/fail operation, processor core 320 provides the pass/fail indication to execution units 324 (e.g., to indicate whether the path of execution should change), as shown at block 432, but does not write to L1 cache 326. Thereafter, the STCX operation is deallocated from L1 STQ 327, and the process terminates at block 434.

Returning to block 426, in response to L1 STQ 327 determining that the store target address of the STCX operation hit in L1 cache 326 at the commit entry, the process proceeds to block 440. Block 440 illustrates L1 STQ 327 initiating sequencer logic 325 to manage the conditional update to L1 cache 326. That is, because the success of the STCX operation is conditioned on the absence of other store operations to the same reservation granule following the point in time that the associated LARX operation binds to a value, the store data of the STCX operation cannot be placed in the L1 cache until the L2 has processed the STCX operation and ensured that it has completed successfully system-wide.

As noted above, L1 STQ 327 is preferably implemented as a FIFO queue, meaning that until the STCX operation in the bottom or "commit" entry of L1 STQ 327 has finished and written to L1 cache 326 (if necessary), L1 STQ 327 is blocked and other store operations cannot make forward progress. In order to avoid a potential deadlock and/or performance degradation, sequencer logic 325 of L1 STQ 327 preferably implements at least one mechanism by which sequencer logic 325 can discontinue waiting for the pass/fail indication from L2 cache 330 in order to update L1 cache 326 and can instead invalidate the target cache line in L1 cache 326.

In a preferred embodiment, sequencer logic 325 of L1 STQ 327 implements two "escape" mechanisms to cause sequencer logic 325 to stop waiting for the pass/fail indication from L2 cache 330 in order to update L1 cache 326. The first of these mechanism is a respective cancel (or latency) signal from L2 cache 330 for each processor core 320 and thread that, when asserted, indicates that L2 cache 330 is likely to delay returning the pass/fail indication (e.g., because of an L2 cache miss, the target cache line is held in Shared state, etc.). As shown at blocks 442 and 444, when sequencer logic 325 of L1 STQ 327 receives the cancel (latency) signal, sequencer logic 325 of L1 STQ 327 invalidates the target cache line in L1 cache 326 if the target cache line is still valid.

The other mechanism by which sequencer logic 325 can abandon the update to L1 cache 326 is an optional timeout counter (T) 329. If implemented, L1 STQ 327 starts timeout counter 329 in response to issuance of a STCX operation to L2 cache 330, and in response to a predetermined, programmable number of cycles elapsing prior to receipt of a pass/fail indication from L2 cache 330 (as indicated by a latency signal generated by timeout counter 329), sequencer logic 325 similarly invalidates the target cache line in L1 cache 326, as shown at block 442 and 444. By abandoning the writeback of the store data to L1 cache 326 in this manner, L1 STQ 327 can continue to make forward progress on other store operations. The process thereafter proceeds from block 444 to block 430, which has been described.

Still referring to FIG. 4B, following a determination at block 442 that no cancel signal has been received from L2 cache 330 and no timeout has occurred, the process passes to block 450. Block 450 illustrates L1 STQ 327 determining whether L1 cache 326 has deallocated the target cache line of the STCX operation or has invalidated the target cache line of the STCX operation, for example, in response to receipt of a back-invalidate signal on back-invalidation bus 372. If so, the process passes to block 430, which has been described. If not, L1 STQ 327 determines whether a pass/fail indication has been received from L2 cache 330 via pass/fail bus 374. If not, the process returns to block 442, representing sequencer logic 325 of L1 STQ 327 waiting until a pass/fail signal or cancel signal is received or a timeout, invalidation or deallocation occurs. In response to a determination at block 452 that a pass/fail indication has been received, sequencer logic 325 of L1 STQ 327 takes the appropriate action. Namely, if the pass/fail indication is a fail indication, the process passes to block 432, which has been described. If, on the other hand, the pass/fail indication is a pass indication, sequencer logic 325 of L1 STQ 327 updates L1 cache 326 with the store data from the STCX operation, as depicted at block 456. Thereafter, the process passes to block 432, which has been described.

Figure 4C:
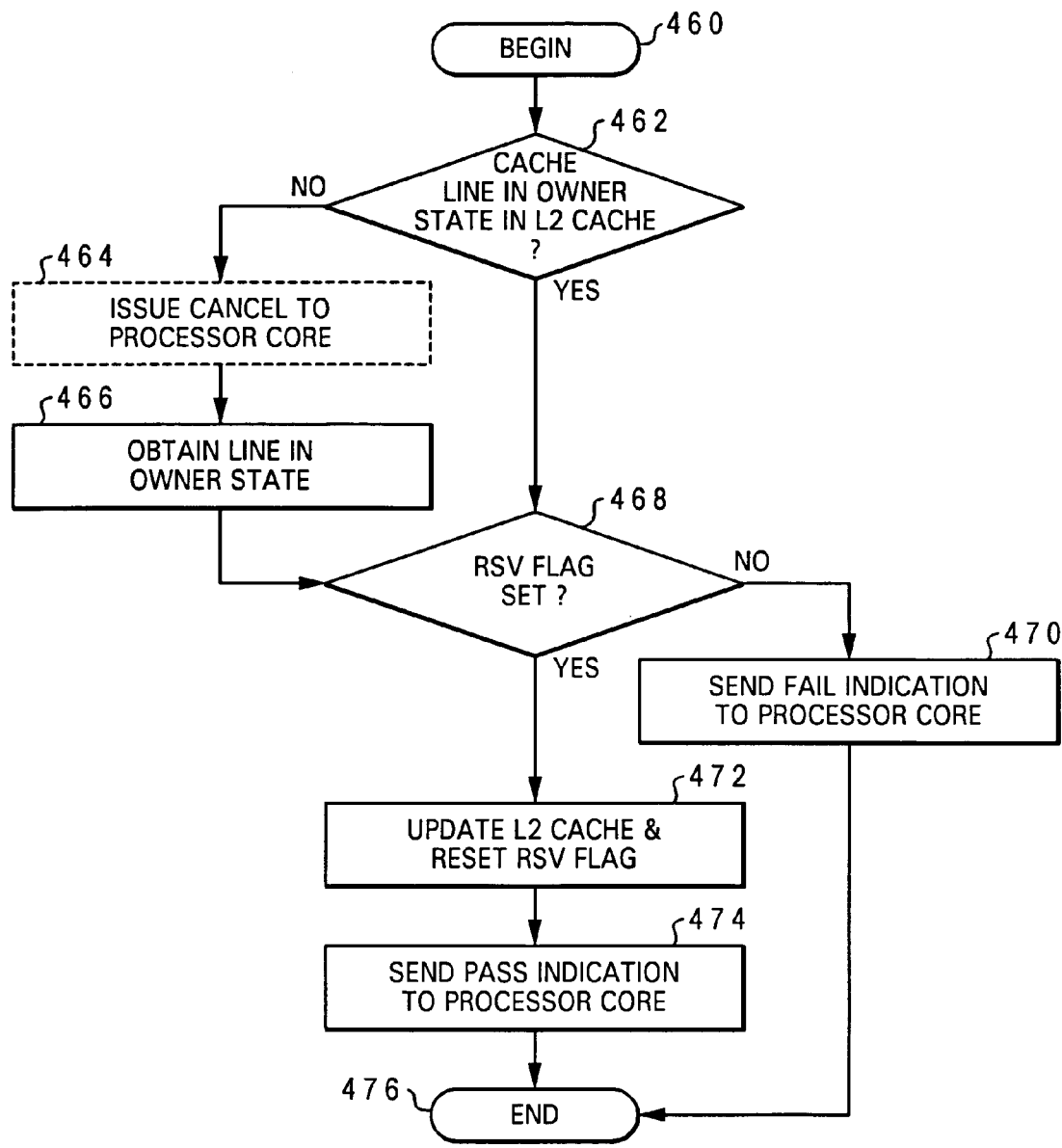
FIG. 4C is a high level logical flowchart of an exemplary method of processing a store-conditional operation in lower level cache in accordance with the present invention.

Referring now to FIG. 4C, there is depicted a high level logical flowchart of an exemplary method of processing a store-conditional operation in lower level cache in accordance with the present invention. As described above, STCX operations are received by L2 cache 330 within L2 STQ 366 via store bus 364. L2 STQ 366, like L1 STQ 327, may be implemented as a FIFO queue. Store operations, including STCX operations, pass from the bottom entry of L2 STQ 366 to RC logic instances 342 for processing. As shown at block 462, when processing a STCX operation, an RC logic instance 342 determines by reference to the L2 directory within storage array and directory 340 whether or not L2 cache 330 holds the target cache line in an "owner" cache state, such as Modified or Exclusive, in which the target cache line can be updated without first obtaining modification ("owner") rights from another processing unit 302. If not, the RC logic instance 342 optionally issues a cancel signal to the processor core 320, as shown at block 464, to indicate that L1 STQ 327 should abandon the STCX update to L1 cache 326. In addition, RC logic instance 342 obtains the target cache line in an "owner" state, for example, by issuing a read-with-intent-to-modify transaction on system interconnect 304. The process shown in FIG. 4C then proceeds to block 468.

Block 468 illustrates the RC logic instance 342 determining whether or not a reservation flag 350 for the store target address is set (i.e., whether or not any other processing core 320 or thread has modified the reservation granule). If not, reservation logic 346 transmits a fail indication to processor core 320 via pass/fail bus 374, as shown at block 470. Thereafter, the process terminates at block 476. If, on the other hand, a determination is made at block 468 that reservation flag 350 is still set, indicating that no other processor core 320 or thread has modified the reservation granule, RC logic instance 342 updates the L2 cache array within storage array and directory 340 with the store data of the STCX operation and resets reservation flag 350, as shown at block 472. Reservation logic 346 also sends a pass indication to processor core 320 at block 474. Thereafter, the process ends at block 476.

Figure 4D:
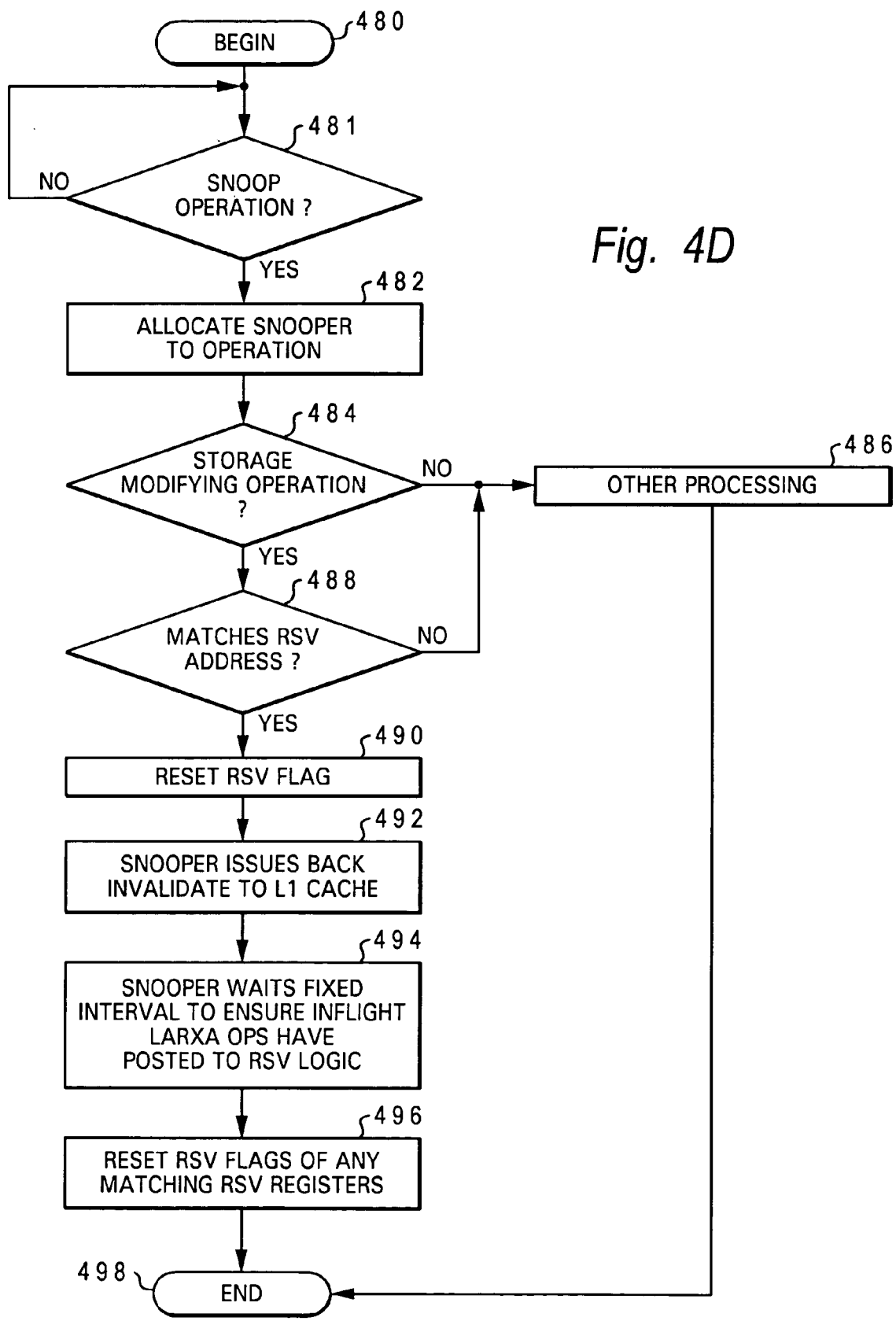
FIG. 4D is a flowchart of an exemplary method of processing operations snooped on a system bus in accordance with the present invention.

With reference now to FIG. 4D, there is illustrated a flowchart of an exemplary method of processing operations snooped on a system bus in accordance with the present invention. As depicted, the process begins at block 480 and thereafter proceeds to block 481, which illustrates the process iterating until L2 cache 330 snoops an operation on system interconnect 304. When L2 cache 330 snoops an operation on system interconnect 304, L2 cache 330 allocates a snoop logic instance 344 to handle the operation at block 482. The snoop logic instance 344 determines at block 484 whether or not the snooped operation is a storage-modifying operation. If not, the process passes to block 486 for other processing (e.g., an L2 directory update) and thereafter terminates at block 498.

If, however, the snoop logic instance 342 determines at block 484 that the snooped operation is a storage-modifying operation, snoop logic instance 344 makes a further determination whether the target address of the storage-modifying operation matches the contents of a reservation address field 348. If not, the process passes to block 486, which has been described. If, however, the target address of the snooped storage-modifying operation matches an address contained in a reservation address field 348, snoop logic instance 344 resets the associated reservation flag 350 to cause any subsequent STCX operation to the address specified in reservation address field 348 to fail, as shown at block 490. In addition, the snoop logic instance 344 issues a back-invalidate signal specifying the target address of the snooped storage-modifying operation to processor core 320 (e.g., L1 cache 326) via back-invalidation bus 372, as shown at block 492. The back-invalidate signal clears the associated cache line from L1 cache 326, thus preventing subsequent LARX operations from hitting in the cache line. It should be noted that while the back-invalidation is underway, RC logic instances 342 and snoop logic instances 344 prevent any STCX or LARX (not LARXA) operations from proceeding until reservation flag 350 is reset and the cache line is invalidated in L1 cache 326.

Following issuance of the back-invalidate signal, the snoop logic instance 344 waits a fixed interval of time, as illustrated at block 494, to ensure that all (now stale) LARXA operations currently in flight to the given cache line have set a reservation flag 350 in reservation logic 346. This wait interval is accordingly equal to or greater than the bounded interval in which LD unit 328 issues LARXA operations to L2 cache 330 via load bus 360. In response to the wait interval elapsing, the snoop logic instance 344 resets the reservation flag 350, if any, associated with a reservation address field 348 containing an address matching the target address of the snooped storage-modifying operation. In a preferred embodiment, the signal that resets the reservation flag 350, if necessary, is a directory write operation that updates the L2 directory within storage array and directory 340 in response to the snooped operation. Thus, reservation flags 350 set by stale LARXA operations are reset in order to satisfy the architectural requirement that a STCX operation conditioned upon a stale LARX must fail. The process thereafter terminates at block 498.

It should be noted that in embodiments of the present invention in which multiple processor cores 320 share an L2 cache 330, as shown in FIG. 3, reservations established by LARX and LARXA operations by processor core 320a can be canceled (i.e. reset) not only by storage-modifying operations snooped by L2 cache 330 on system interconnect 304, but also by storage-modifying operations by another processor core 320b sharing L2 cache 330. In such embodiments, the RC logic instance 342 receiving the storage-modifying operation from processor core 320b performs the steps depicted in FIG. 4D in the same manner described above, as well as the storage update specified by the storage-modifying operation.

Figure 5A:
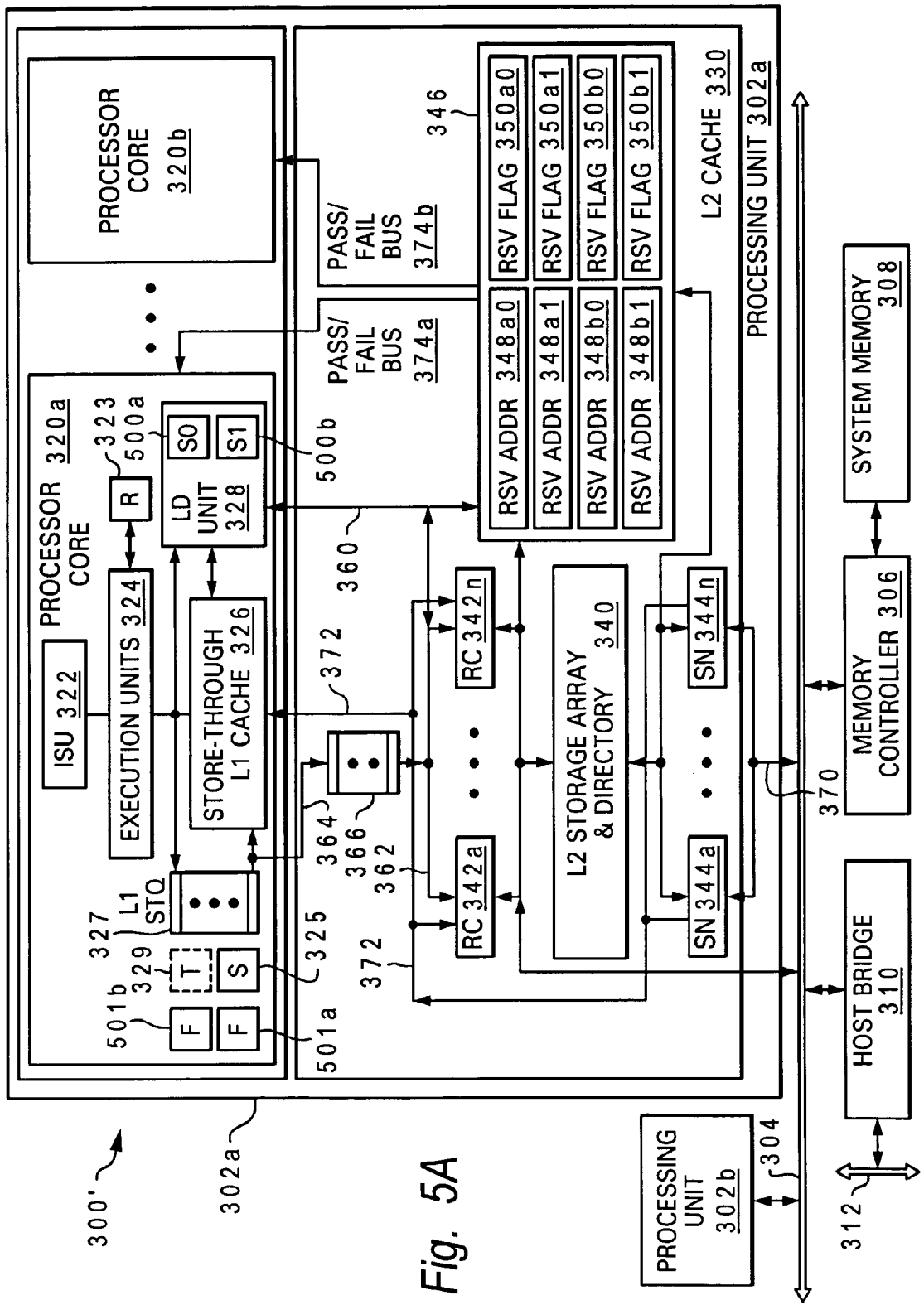
FIG. 5A is a high level block diagram of an exemplary multiprocessor data processing system having processor cores that support multiple concurrent, hardware-managed threads in accordance with one embodiment of the present invention.

With reference now to FIG. 5A, there is illustrated a data processing system 300' in which one or more processor cores 320 support multiple, concurrent hardware-managed threads of execution. As indicated by prime notation (') and the use of like reference numerals, data processing system 300' is similar to data processing system 300 described above, with some modifications to support multi-threading. In particular, reservation logic 346 has been expanded to include a respective reservation register for each concurrent hardware-managed thread supported by the associated processor cores 320. For example, in the illustrated embodiment in which each of processing cores 320a, 320b supports up to two concurrent hardware-managed threads of execution, reservation logic 346 contains reservation address field 348a0 and reservation flag 350a0 for thread0 of processor core 320a, reservation address field 348a1 and reservation flag 350a1 for thread1 of processor core 320a, reservation address field 348b0 and reservation flag 350b0 for thread0 of processor core 320b, and reservation address field 348b0 and reservation flag 350b1 for thread1 of processor core 320b.

As further illustrated in FIG. 5A, the LD unit 328 of each processor core 320 is expanded to include an instance of sequencer logic 500a, 500b for each concurrent hardware-managed thread. As described below, sequencer logic instances 500a, 550b coordinate load-reserve and store-conditional operations between threads in the same processor core 320 to ensure that memory updates performed by one thread will cause a conflicting STCX operation by the other thread to fail. Thus, a multi-threaded processor core 320 must account for at least three sources of storage-modifying operations that must cause a STCX operation to fail: (1) other processing units 302, (2) other processor core(s) 320 in the same processing unit 302, and now (3) other concurrent hardware-managed thread(s) executing in the same processor core 320.

Figure 5B:
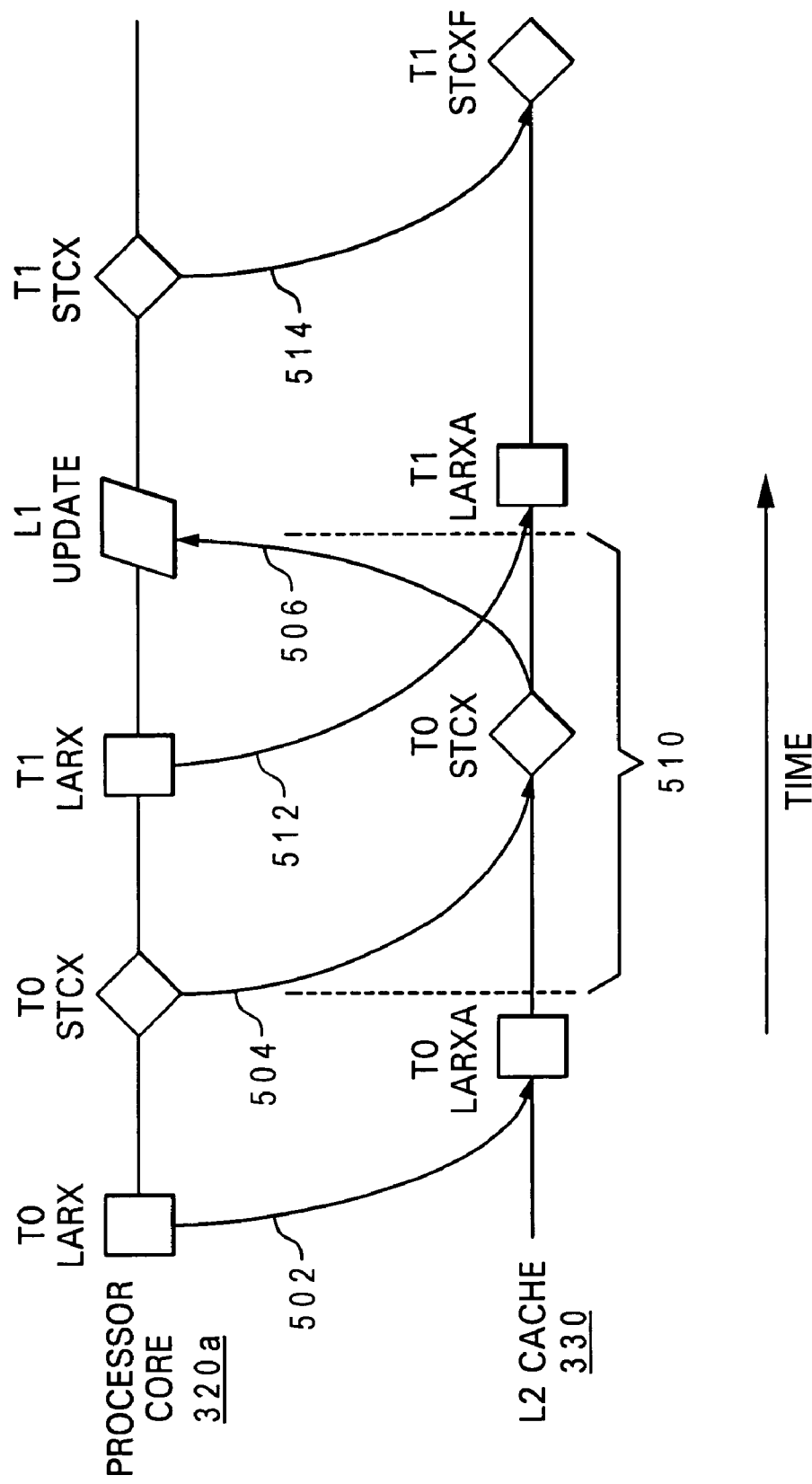
FIG. 5B is a time-space diagram depicting a reservation hazard window in which a storage-modifying operation of one hardware-managed thread may conflict with a load-reserve operation of another concurrent hardware-managed thread executing within the same processor core.

Referring now to FIG. 5B, there is depicted a time-space diagram illustrating a reservation hazard window in which a storage-modifying operation of one hardware-managed thread may conflict with a load-reserve operation of another concurrent hardware-managed thread executing within the same processor core 320. In the depicted operating scenario, thread0 (T0) of a processor core 320a first executes a load-reserve instruction that binds in store-through L1 cache 326 and accordingly causes a corresponding LARXA operation to be sent to L2 cache 330 to establish a reservation for a reservation granule containing the load target address, as shown at reference numeral 502 and as previously described with respect to block 406 of FIG. 4A. Subsequently, in response to execution of a store-conditional instruction within the same thread0, processor core 320a transmits a STCX operation 504 to L2 cache 330 to resolve whether or not the conditional update to storage indicated by the store-conditional instruction should be performed in store-through L1 cache 326. As described above, the load-reserve and store-conditional instructions are executed within thread0 in-order and without pipelining. No update to store-through L1 cache 326 is made in response to the execution of the store-conditional instruction unless and until a pass indication 506 is received from L2 cache 330 indicating that the STCX operation succeeded.

As shown in FIG. 5B, the issuance of STCX operation 504 from processor core 320a initiates a reservation hazard window 510 that closes when store-through L1 cache 326 is updated (or not) in response to the pass/fail indication received by processor core 320a from L2 cache 330. Any store-conditional operation associated with a "conflicting" load-reserve operation of thread1 of processor core 320a during reservation hazard window 510 (e.g., LARXA operation 512) is required to fail if STCX operation 504 of thread0 receives a pass indication from L2 cache 330 because the value obtained by the load-reserve operation may be superceded by the data written into L1 cache 326 by STCX operation 504. As will appreciated by those skilled in the art, various implementations of the present invention may apply different precision to the definition of what load-reserve operations are deemed to be "conflicting." For example, some implementations assume that a load-reserve operation conflicts with an earlier store-conditional operation if the load-reserve operation targets the same cache line in store-through L1 cache 326. Of course, other address granularities can be utilized in determining a conflict, including, for example, the L2 reservation granule size or 4-byte words.

In order to ensure that, if necessary, the store-conditional operation of thread1 fails, sequencer logic instance S1 500b manages the state of a respective flag 501b in the manner described below so that, when set, flag 501b causes a subsequent STCX operation 514 to issue from L1 STQ 327 with a fail indication (an operation hereinafter referred to as a "STCXF" operation). STCXF operation 514 forces L2 cache 330 to return a fail indication for STCX operation 514, thus preventing an update to store-through L1 cache 326.

Figure 5C:
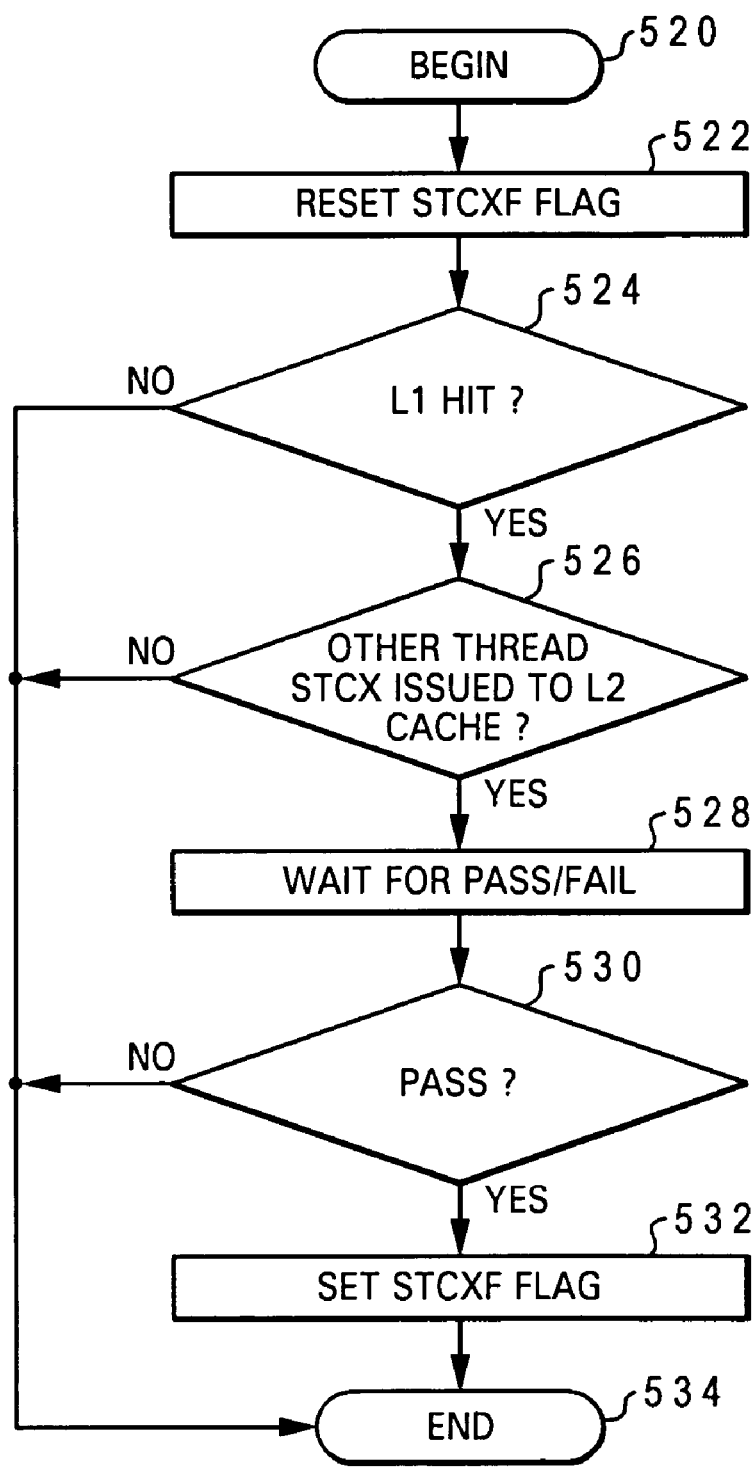
FIG. 5C is a high level logical flowchart of an exemplary method of managing a STCXF flag in accordance with one embodiment of the present invention.

With reference now to FIG. 5C, there is illustrated a high level logical flowchart of an exemplary method of operation of a sequencer logic instance 500 in accordance with one embodiment of the present invention. In the described embodiment, each processor core 320 implements a respective flag 501a, 501b for each supported concurrent thread, and the process will be described with respect to sequencer logic instance 500b and flag 501b.

As depicted, the process begins at block 520 in response to receipt of a load-reserve operation of thread1 by LD unit 328 and thereafter proceeds to block 522, which illustrates sequencer logic instance 500b resetting its respective STCXF flag 501b. In the reset state, STCXF flag 501b indicates that a STCXF operation should not be issued. When LD unit 328 accesses store-through L1 cache 326 as shown at block 404 of FIG. 4A, sequencer logic instance 500b receives an indication of whether or not a cache line containing the load target address resides in store-through L1 cache 326 (i.e., whether or not a cache hit occurred), as indicated at block 524. If the load target address missed in L1 store-through cache 326, LD unit 328 issues a LARX operation to L2 cache 330, as described above with respect to block 410 of FIG. 4A, and sequencer logic instance 500b returns to an idle state, as shown at block 534.

If, however, the load target address hit in L1 cache 326, LD unit 328 transmits a LARXA operation to L2 cache 330, as depicted at block 406 of FIG. 4A, and sequencer logic instance 500b receives a hit indication at block 524. In response to the hit indication, sequencer logic instance 500b determines at block 526 whether the other thread (thread0) has a STCX operation in the commit entry of L1 STQ 327 (e.g., STCX operation 504) that has been issued to L2 cache 330. This determination may be made, for example, by examining the operation in the commit entry of L1 STQ 327 and the state of a 1-bit thread identifier that preferably accompanies each store operation throughout the processing unit 302. If a STCX operation from thread0 does not reside in the commit entry of L1 STQ 327, sequencer logic instance 500b returns to an idle state, as shown at block 534. If, however, sequencer logic instance 500b determines at block 526 that a STCX operation from thread0 resides in the commit entry of L1 STQ 327, sequencer logic instance 500b waits for the return of the pass/fail indication (e.g., pass/fail indication 506) for the STCX operation, as depicted at block 528.

If the STCX operation receives a fail indication as tested at block 530, sequencer logic instance 500b returns to an idle state, as shown at block 534. If, however, the STCX operation of thread0 receives a pass indication, meaning that any STCX to the load target address of the LARXA of thread1 will fail, sequencer logic instance 500b sets STCXF flag 501b at block 522. Thereafter, sequencer logic instance 500b returns to an idle state at block 534.

Figure 5D:
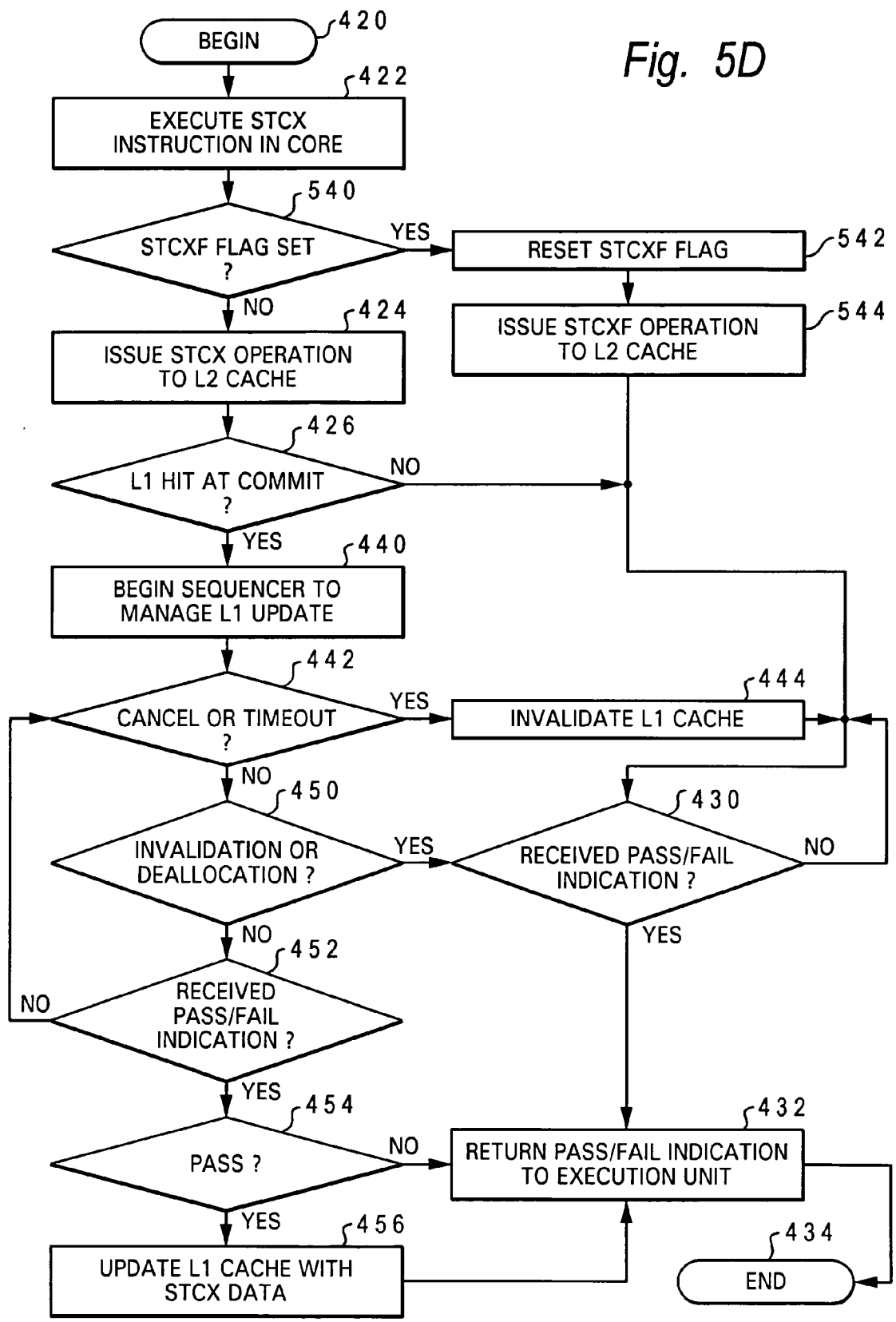
FIG. 5D is a high level logical flowchart of an exemplary method of processing a store-conditional instruction and corresponding store-conditional operation in a multi-threaded processor core in accordance with the present invention.

Referring now to FIG. 5D, there is a depicted a high level logical flowchart of an exemplary method of processing a store-conditional instruction in a multi-threaded processor core 320 in accordance with the present invention. As can be seen upon comparison of FIG. 5D with FIG. 4B, the illustrated method is similar to that described above for uni-threaded processor core 320, with the exception of the inclusion of blocks 540–544, which support the use of the above-described STCXF operation.

Following execution of a STCX instruction within processor core 320 at block 422, a corresponding STCX operation is placed within L1 STQ 327. As described above, L1 STQ 327, which may be implemented as a FIFO queue, orders store operations, both within a thread and between threads. When the STCX operation corresponding to the STCX instruction reaches the bottom or commit entry of L1 STQ 327, L1 STQ 327 determines at block 540 whether or not the associated one of STCXF flags 501a, 501b is set to indicate that a STCXF operation should be transmitted to L2 cache 330. If not, the process proceeds from block 540 to block 424 and following blocks, which as described above, include transmitting a STCX operation to L2 cache 330.

If, however, L1 STQ 327 determines at block 540 that the associated one of STCXF flags 501a, 501b is set, L1 STQ 327 resets the STCXF flag 501, as shown at block 542, and issues a STCXF operation to L2 cache 330 at block 544. As noted above, a STCXF operation is simply a STCX operation having an accompanying fail flag indicating that the operation should receive a fail indication from L2 cache 330 and should not update store-through L1 cache 326. Following block 544, the process passes to block 430, which has been described.

Figure 5E:
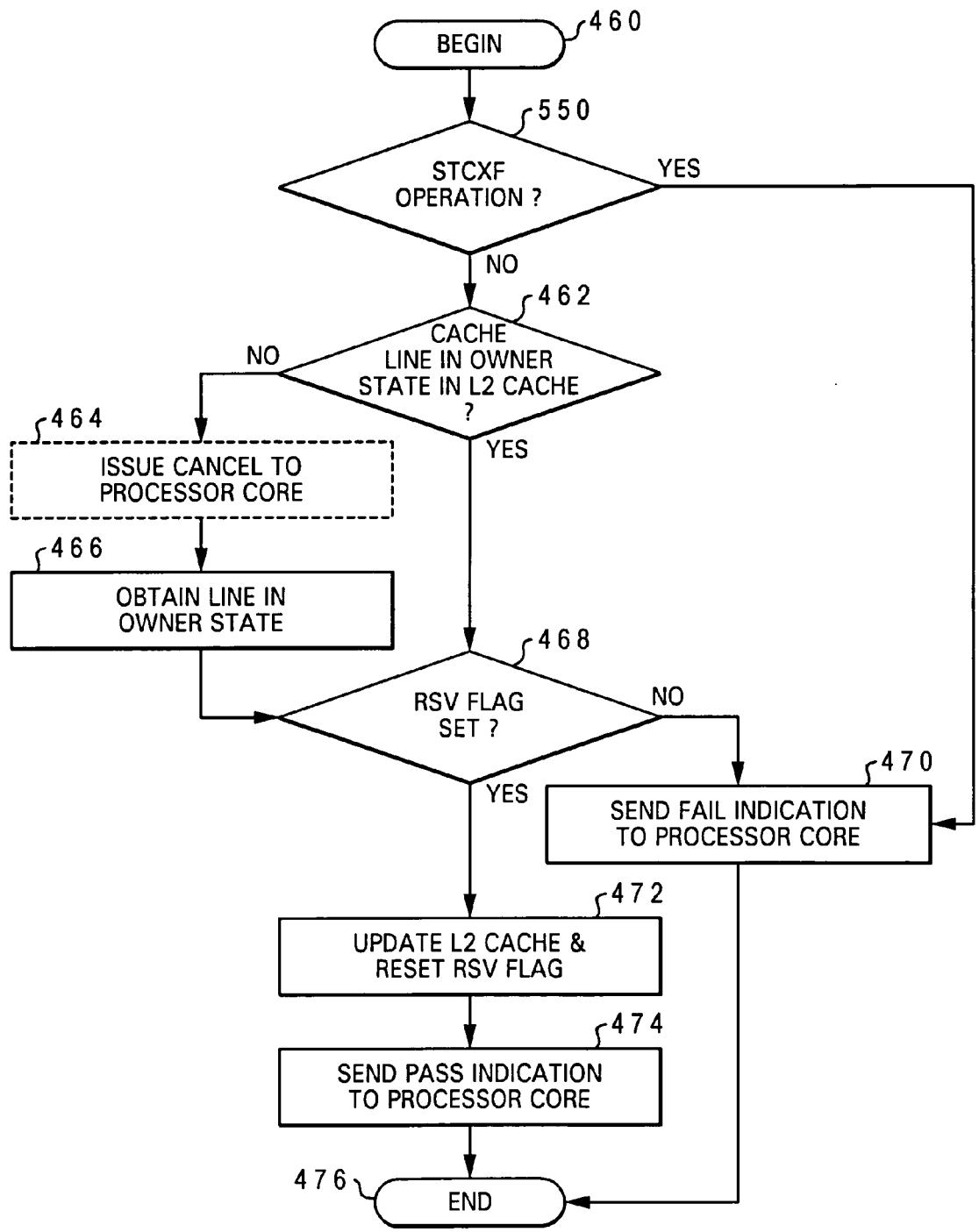
FIG. 5E is a high level logical flowchart of an exemplary method of processing a store-conditional operation in a lower level cache of a data processing system having multi-threaded processor cores in accordance with an embodiment of the present invention.

With reference now to FIG. 5E, there is illustrated a high level logical flowchart of an exemplary method of processing a store-conditional operation in a lower level cache 330 in accordance with the present invention. As can be seen upon comparison of FIG. 5E with FIG. 4C, the illustrated method is similar to that described above for uni-threaded processor cores 320, with the exception of the inclusion of block 550, which supports the use of the above-described STCXF operation.

In particular, after the STCXF operation is queued within L2 STQ 366, the STCXF operation is received by an RC logic instance 342 of L2 cache 330. In response to receipt of the STCXF operation, the RC logic instance 342 determines at block 550 whether or not the received operation is a STCXF operation. If not, the process passes to block 462 and following blocks, which have been described. If, however, the RC logic instance 342 detects a fail flag signifying a STCXF operation, the RC logic instance 342 notifies reservation logic 346, which sends a fail indication (with a thread identifier) to the appropriate processor core 320, as shown at block 470. As described above, the fail indication causes the conditional storage update indicated by the STCX instruction to not be performed.

As has been described, the present invention provides improved processing units, data processing systems, and methods for synchronizing updates to shared memory utilizing load-reserve and store-conditional instructions. In accordance with one aspect of the present invention, load-reserve operations are permitted to bind to possibly stale values in the L1 cache prior to determining whether the values are stale. If it is determined that the value to which the load-reserve operation bound in the L1 cache is stale, a subsequent store-conditional operation to the same reservation granule fails. If the value is determined to not be stale, the subsequent store-conditional operation succeeds, and the cache line containing the value to which the load-reserve operation bound is advantageously retained in the L1 cache.

In another aspect, the present invention supports load-reserve operations to bind in the L1 cache in the presence of concurrent, hardware-managed multi-threading. To provide such support, the processor core includes sequencer logic that detects a load-reserve operation of one thread within the reservation hazard window defined by a store-conditional operation of another thread and associated pass/fail indication. When such a load-reserve operation is detected, the processor core ensures that any associated store-conditional operation to a matching address fails if the store-conditional operation of the other thread succeeds.

While the invention has been particularly shown as described with reference to a preferred embodiment, it will be understood by those skilled in the art that various changes in form and detail may be made therein without departing from the spirit and scope of the invention. For example, although the invention has been described with reference to a particular embodiment of a memory hierarchy in which L1 and L2 caches are incorporated within a processing unit, those skilled in the art will appreciate that additional levels of in-line or lookaside caches may be employed and that, in some embodiments of the invention, one or more levels of cache may be off chip.

What is claimed is:

1. A processing unit for a multiprocessor data processing system, said processing unit comprising:
    a processor core including:
       a store-through upper level cache;
       an instruction sequencing unit that fetches instructions for execution;
       a data register;
       at least one instruction execution unit coupled to said instruction sequencing unit that concurrently executes multiple threads of instructions; and
       wherein the processor core, responsive to the at least one instruction execution unit executing a load-reserve instruction in a first thread that binds to a load target address in the store-through upper level cache during a reservation hazard window associated with a conflicting store-conditional operation of a second thread, causes a subsequent store-conditional operation of said first thread to a store target address matching the load target address to fail if said store-conditional operation of said second thread succeeds.

2. The processing unit of claim 1, wherein the multiprocessor data processing system includes a lower level cache supporting the processing unit, wherein said processor core issues said store-conditional operation of said second thread to the lower level cache with a fail flag.

3. The processing unit of claim 2, and further comprising the lower level cache.

4. The processing unit of claim 1, said processor core further comprising:
    a flag having a state indicating that said subsequent store-conditional operation of said first thread should fail; and
    a sequencer logic instance that sets said flag to said state in response to receipt of an indication that said conflicting store-conditional operation of said second thread succeeds.

5. The processing unit of claim 1, wherein the multiprocessor data processing system includes a lower level cache supporting the processing unit, and wherein said reservation hazard window begins when said processor core issues said store-conditional operation of said second thread to said lower level cache and ends when said store-conditional operation of said second thread succeeds or fails.

6. The processing unit of claim 5, wherein said lower level cache includes a reservation register that stores an address of a reservation granule in association with a reservation flag, wherein said lower level cache transmits an indication of whether said store-conditional operation of said second thread succeeds of fails based on a state of the reservation flag.

7. The processing unit of claim 1, and further comprising a store queue that serializes store operations of the first and second threads.

8. A data processing system, comprising:
    a system memory;
    a system interconnect; and
    a plurality of processing units coupled to the system interconnect, at least a particular processing unit among said plurality of processing units including:
       a processor core including:
          a store-through upper level cache;
          an instruction sequencing unit that fetches instructions for execution;
          a data register;
          at least one instruction execution unit coupled to said instruction sequencing unit that concurrently executes multiple threads of instructions; and
          wherein the processor core, responsive to the at least one instruction execution unit executing a load-reserve instruction in a first thread that binds to a load target address in the store-through upper level cache during a reservation hazard window associated with a conflicting store-conditional operation of a second thread, causes a subsequent store-conditional operation of said first thread to a store target address matching the load target address to fail if said store-conditional operation of said second thread succeeds.

9. The data processing system of claim 8, wherein the data processing system includes a lower level cache supporting the processing unit, wherein said processor core issues said store-conditional operation of said second thread to the lower level cache with a fail flag.

10. The data processing system of claim 9, and further comprising the lower level cache.

11. The data processing system of claim 8, said processor core further comprising:
   a flag having a state indicating that said subsequent store-conditional operation of said first thread should fail; and
   a sequencer logic instance that sets said flag to said state in response to receipt of an indication that said conflicting store-conditional operation of said second thread succeeds.

12. The data processing system of claim 8, wherein the data processing system includes a lower level cache supporting the processing unit, and wherein said reservation hazard window begins when said processor core issues said store-conditional operation of said second thread to said lower level cache and ends when said store-conditional operation of said second thread succeeds or fails.

13. The data processing system of claim 12, wherein said lower level cache includes a reservation register that stores an address of a reservation granule in association with a reservation flag, wherein said lower level cache transmits an indication of whether said store-conditional operation of said second thread succeeds or fails based on a state of the reservation flag.

14. The data processing system of claim 8, and further comprising a store queue that serializes store operations of the first and second threads.

15. A method of data processing in a data processing system including a memory hierarchy including a store-though upper level cache, a lower level cache and a system memory, said method comprising:
   in at least one instruction execution unit of a processing unit, concurrently executing first and second threads of instructions;
   detecting a load-reserve instruction in the first thread that binds to a load target address in the store-through upper level cache during a reservation hazard window associated with a conflicting store-conditional operation of the second thread;
   in response to said detection, causing a subsequent store-conditional operation of said first thread to a store target address matching the load target address to fail if said store-conditional operation of said second thread succeeds.

16. The method of claim 15, wherein the data processing system includes a lower level cache supporting the processing unit, wherein causing a subsequent store-conditional operation of said first thread to fail comprises issuing said store-conditional operation of said second thread to the lower level cache with a fail flag.

17. The method of claim 15, and further comprising:
   providing a flag having a state indicating that said subsequent store-conditional operation of said first thread should fail; and
   setting said flag to said state in response to receipt of an indication that said conflicting store-conditional operation of said second thread succeeds.

18. The method of claim 15, wherein the data processing system includes a lower level cache supporting the processing unit, and wherein said reservation hazard window begins when said store-conditional operation of said second thread is issued to said lower level cache and ends when said store-conditional operation of said second thread succeeds or fails.

19. The method of claim 18, wherein said lower level cache includes a reservation register that stores an address of a reservation granule in association with a reservation flag, wherein said method further comprises said lower level cache transmitting an indication of whether said store-conditional operation of said second thread succeeds or fails based on a state of the reservation flag.

20. The method of claim 15, and further comprising serializing store operations of the first and second threads.

* * * * *